Dec. 22, 1953     F. E. BROWN     2,663,191
TANK THERMOMETER
Filed Nov. 13, 1948
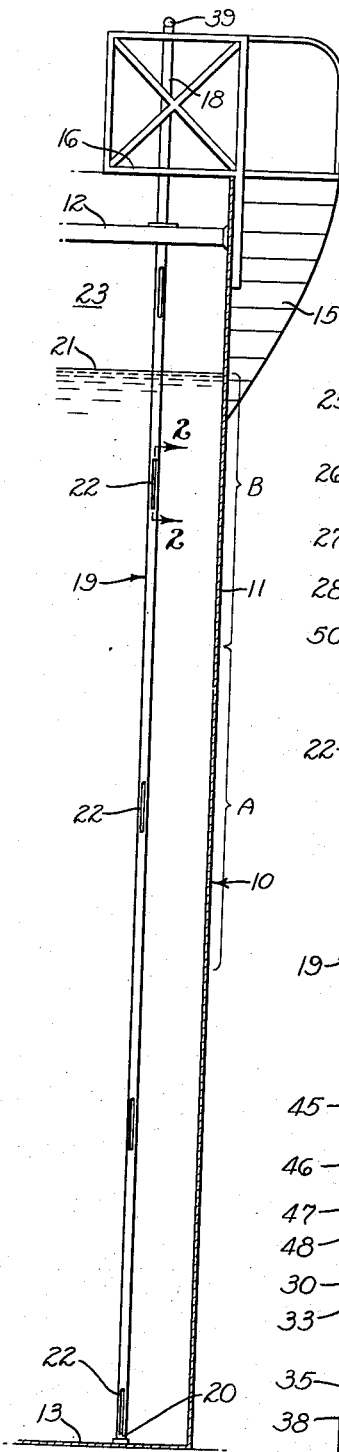
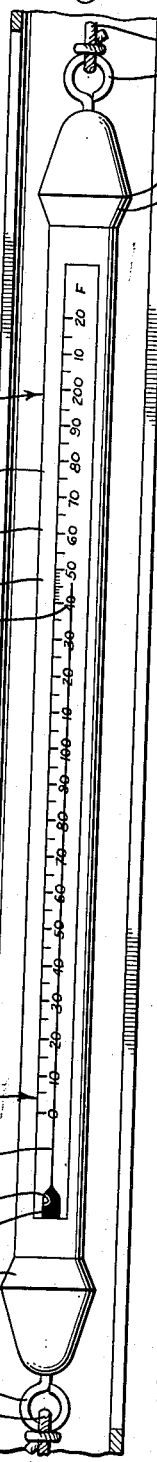
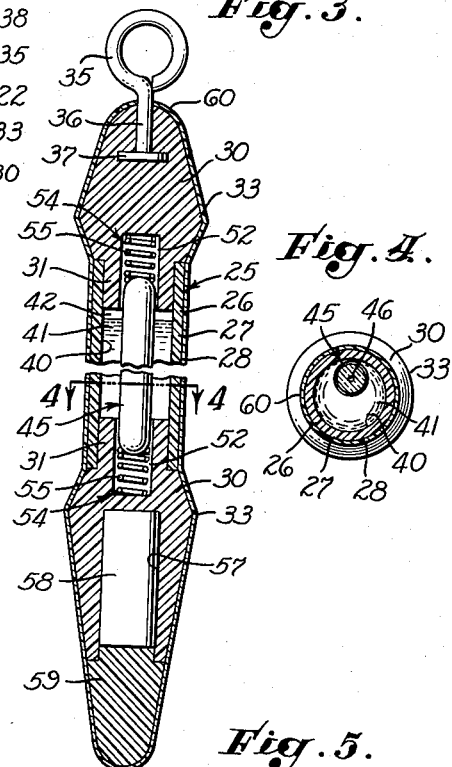
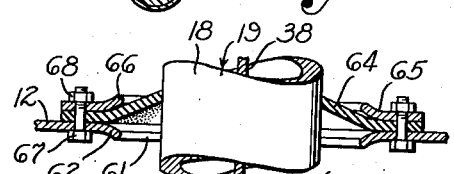
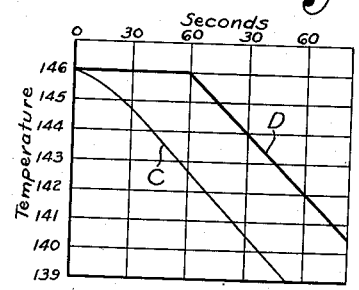
INVENTOR.
FRANK E. BROWN
BY HIS ATTORNEYS:
HARRIS, KIECH, FOSTER & HARRIS Patented Dec. 22, 1953

2,663,191

UNITED STATES PATENT OFFICE 2,663,191

TANK THERMOMETER

Frank E. Brown, Burbank, Calif., assignor to Frederick M. Turnbull, Los Angeles, Calif.

Application November 13, 1948, Serial No. 59,862

9 Claims. (Cl. 73—340)

My invention relates to improvements in thermometers and more particularly to thermometers adapted to be utilized to ascertain the temperature of the contents of large tanks, such as storage tanks, at various levels therein.

For the purpose of illustrating the manner of construction and mode of operation of my invention, it is described as being utilized in conjunction with a storage tank containing volatile fluids such as gasoline, but it is obvious that my invention may be utilized in a wide variety of applications and I, therefore, do not intend to limit its use to the specific field herein discussed.

It is common practice in the oil industry to take the temperature of the contents of storage tanks at different levels within the tanks to ascertain the temperatures of said contents at said different levels in order that the volume of the liquid contents may be accurately calculated on a standard temperature base. To make these temperature readings, a tubular thermometer of conventional type is inserted into the interior of the tank through an opening in the top thereof and is permitted to descend in the contents of the tank to a predetermined level. The thermometer is held at the predetermined level until its temperature rises to the temperature existing at said level, and it is then drawn upwardly through the body of the fluid to the exterior of the tank for reading. Since the temperature of the liquid above the level at which the temperature reading has been made is frequently several degrees above the temperature at the reading level and since the vapors at the top of the tank are also at a higher temperature, it frequently happens that the thermometer, when drawn to the exterior of the tank, shows a temperature which is greater than the temperature of the predetermined level at which it was suspended. Naturally, the inaccurate temperature reading results in inaccurate gaging of the contents of the storage tank.

It is, therefore, a primary object of my invention to provide a thermometer adapted to ascertain the temperature of the contents of a storage tank at a predetermined level thereof which will not be influenced by the temperatures of the liquid above the predetermined level or by the temperature of the vapors above said liquid.

Other factors tending to render temperature readings obtained with an ordinary thermometer inaccurate are the exposure of the thermometer to atmospheric temperatures at the exterior of the tank and the volatilization of the fluids retained upon the surface of the thermometer which induces a refrigeration effect and materially lowers the temperature reading.

Another object of my invention is the provision of a thermometer which will not be immediately affected by its exposure to atmospheric temperatures or the volatilization of fluid upon its surface.

An additional object of my invention is the provision of a tank thermometer which includes a conventional tubular thermometer mounted within a housing having a transparent wall portion through which the indicia upon the body of the thermometer tube can be read.

Frequently, the indicia upon conventional thermometers utilized for the purpose indicated are so small that the reading thereof is difficult and occasionally results in the recording of erroneous temperature figures.

It is a further object of my invention to provide a tank thermometer which includes a housing having a transparent wall portion adapted to magnify, to some extent, the indicia upon the surface of a thermometer tube enclosed within said housing.

It is a concomitant object of my invention to provide a tank thermometer which includes a housing having a transparent, intermediate portion enclosing a thermometer tube, said portion incorporating a body of fluid adapted to isolate and separate the thermometer tube from the wall of the intermediate portion in order to stabilize a temperature reading obtained upon the thermometer tube by insulating the thermometer tube temporarily from the fluid levels through which the tube is drawn after a reading has been made at a predetermined level.

An additional object of my invention is the provision of a tank thermometer embodying a thermometer tube surrounded by a body of fluid adapted to insulate the thermometer tube temporarily from surrounding fluid or atmosphere, in which the thermometer tube has its vertical axis eccentrically positioned with respect to the vertical axis of said housing to place the greater proportion of the body of fluid in front of said tube to magnify the indicia borne upon the tube.

Since tank thermometers are frequently subjected to rough usage, it is desirable to protect them as effectively as possible against the results of rough handling. Another object of my invention is the provision of a housing incorporating a conventional thermometer tube which provides shock-absorption means adapted to isolate said tube from impact blows borne upon said housing. Of course, the fluid in which the thermometer tube is immersed also serves to cushion any shocks which may be borne by said housing.

An additional object of my invention is the provision of an apparatus for taking the temperature of fluids stored within a tank which includes a guide means adapted to be inserted into the contents of the tank and designed to receive a thermometer therein, said guide means serving to prevent the deflection of said thermometer within the contents of said tank and also to prevent damage to said thermometer.

An additional object of my invention is the provision of a thermometer having a transparent, intermediate portion which is shielded from injurious contact with surrounding areas by bumpers provided at the opposite ends of said intermediate portion.

Another object of my invention is the provision of a tank thermometer including a housing having an intermediate transparent portion which is provided with a transparent plastic coating adapted to seal the joints in said housing against the leakage of fluid from the interior of said housing or the seepage of fluid from the exterior thereof into said interior.

An additional object of my invention is the provision of a tank thermometer having a smooth surface from which the fluid in which it has been immersed can be readily removed in order that an indicia reading can be readily made.

Other objects and advantages of my invention will be made apparent by a consultation of the following specification and the accompanying drawing, in which:

Fig. 1 is a vertical, partly sectional, partly elevational view showing an apparatus constructed in accordance with my invention and installed in a storage tank;

Fig. 2 is an enlarged elevational view taken on the broken line 2—2 of Fig. 1;

Fig. 3 is a fragmentary, vertical, sectional view of a thermometer constructed in accordance with my invention;

Fig. 4 is a transverse, sectional view taken on broken line 4—4 of Fig. 3;

Fig. 5 is a longitudinal, sectional view showing a preferred form of sealing means utilized in conjunction with my temperature-gaging apparatus; and Fig. 6 is a graph indicating the manner in which a thermometer constructed in accordance with my invention will retain a specific temperature reading for a predetermined time.

Referring to the drawing, I show an oil storage tank 10, having a circular side wall 11 provided with a top or roof 12 and a bottom 13. The roof 12 is shown as being a conventional movable or floating roof which is adapted to move up and down within the circular wall 11 of the tank as the quantity of fluid within the tank increases or decreases. Of course, my invention is not limited to use with a tank of any particular construction, since it is obvious that it can be as readily used with a tank having a fixed roof or top or no roof. Stairs 15 are provided which permit the gager taking the temperature reading to mount to a platform 16 which overhangs the roof 12 of the tank 10.

Projecting upwardly through the movable roof 12 of the tank 10, adjacent the platform 16, is the upper end 18 of a guide means in the form of a pipe 19, the greater portion of whose length is disposed within the interior of the tank 10 and liquid 21 contained therein. The lower end 20 of the guide pipe 19 rests upon the bottom 13 of the tank 10 and may be securely attached thereto to prevent lateral movement of the guide pipe 19 when the liquid 21 is being removed from or fed into the tank 10.

Provided along the length of the guide pipe 19 is a plurality of vertically spaced slots or longitudinal openings 22. These slots or openings 22 are oppositely disposed, as is shown in Fig. 2 of the drawing, and permit the fluid stored within the tank 10 to flow through the interior of the guide pipe 19, for a purpose which will be described in greater detail below. Since the fluid 21 stored within the tank 10 is commonly a volatile hydrocarbon, such as gasoline, vapors, indicated generally at 23, tend to rise to the space between the surface of the liquid 21 and the roof 12 of the tank.

It is well known that the temperature at different levels within a large volume of liquid such as gasoline will vary considerably and, therefore, a reading taken at one level of such a body of fluid does not necessarily indicate the temperature of the remainder of the fluid at different levels. Thus, the openings 22 are provided in the length of the guide pipe 19 adjacent predetermined levels within the body of fluid 21 stored in the tank 10 so that an accurate reading of the temperature at the different levels of the fluid 21 may be secured. For instance, one of the openings 22 is disposed within the fluid zone "A" and another of the openings 22 is disposed within the fluid zone "B." Thus, fluid in these zones is able to circulate through the oppositely disposed openings 22 and into the interior of the guide pipe 19, for a purpose which will be described in greater detail below.

A string of connected tank thermometers 25 is adapted to be immersed in the body of fluid 21 and to be guided thereinto and maintained therein by means of the guide pipe 19. Each of the tank thermometers 25 includes an elongated housing 26 comprising an intermediate transparent tubular portion 27, which provides a transparent wall 28, and enlarged end members in the form of plugs 30. The intermediate tubular portion 27, in the present embodiment of my invention, constitutes the greater length of the housing 26, but it is, of course, obvious that the length of the tubular portion will be determined by the temperature range in which the thermometer 25 is designed to operate. The ends of the immediate tubular portion 27 of the housing 26 are closed by means of the plugs 30 having cylindrical, reduced portions 31 adapted to be inserted into the ends of the intermediate tubular portion 27 and to be fastened therein by means of a suitable adhesive to isolate the interior of the intermediate tubular portion 27 from contact by the fluid 21 in which the thermometer 25 is to be immersed. Although any material having transparent qualities may be utilized to form the intermediate tubular portion 27 of the thermometer 25, I prefer to use a plastic substance which, while providing the necessary transparency, is also substantially unbreakable and possessed of sufficient flexibility to permit the intermediate tubular portion 27 to bend slightly when the housing 26 strikes upon an adjacent object. It is also contemplated that the portion 27 may be made of a tempered glass such as Pyrex. The curvilinear wall 28 is also utilized to provide a magnifying effect for an object housed within the intermediate tubular portion, as will be described in greater detail below.

The plugs 30 which serve to close the opposite ends of the intermediate tubular portion 27 have integral, expanded portions 33 which serve as bumper means to prevent the exterior of the wall 28 from contacting adjacent surfaces and being abraded thereupon. As may be seen from Fig. 2 of the drawing, when one of the thermometers 25 is suspended within the interior of the guide pipe 19, it is desirable that it be suspended with its vertical axis substantially co-axial with the vertical axis of said guide pipe 19. Since any abrasion of the exterior of the transparent wall 28 would result in reducing the transparency of said wall, the bumper portions 33 of the plugs 30 prevent the contact of said wall 28 with the interior of the guide pipe 19. In addition, when the thermometers are suspended within the interior of guide pipe 19, they are disposed within said interior the vertical slots or openings 22 so that the fluid 21 within the different zones may flow through the openings about the periphery of the housing 26. The bumper portions 33 of the plugs 30 serve to prevent the wall 28 of the intermediate tubular portion 27 of the housing 26 from engaging the openings 22 in a sealing relationship therewith and which would prevent the free flow of the fluid through the openings 22 and about the periphery of the housing 26 of the thermometer 25.

Secured in the plugs 30, as by being molded therein, are eyes 35 having elongated shafts 36 upon the ends of which are formed integral discs 37 surrounded with the material, preferably plastic, of which the plugs 30 are formed and which serve to prevent the dislodgment of the eyes 35 from the bodies of the plugs 30. When the intermediate tubular portion 27 is made of tempered glass, the plugs 30 may also be molded in glass. The utilization of the eyes 35 instead of the conventional bails previously utilized in tank thermometers prevents the inadvertent loss of the housing 26 and thus avoids the possibility that a thermometer 25 may be left within the guide pipe 19.

When it is desired to ascertain the temperature of the fluid 21 at different levels within the storage tank 10, a plurality of the thermometers 25 is strung together by means of the eyes 35 and strong, flexible cords 38 which are knotted to the eyes at opposite ends of the thermometers. The cords are of sufficient length to juxtapose the thermometers 25 to the openings 22 in the guide pipe 19 when the entire string of thermometers has been let down into the guide pipe 19.

Secured to the upper end of the string of thermometers 25 and connected thereto by means of one of the cords 38 is a ball 39 which is adapted to rest upon the top of the guide pipe 19 when the thermometer string is let down into the interior of said pipe. In addition to functioning as a grasping means by which the thermometer string may be let down into and withdrawn from the interior of the tank 10, the ball 39 serves as a closure to seal the opening to the interior of the tank 10 through the body of the guide pipe 19 and thus prevents the loss of vapors contained within the tank 10 through the guide pipe 19.

The space defined by the wall 28 of the intermediate tubular portion 27 of the housing 26 and closed off by the plugs 30 constitutes a generally cylindrical chamber 40 which serves as a receptacle for a body of liquid 41 which is adapted to be permanently retained within the chamber 40. An expansion space 42 is provided within the chamber 40 to accommodate the expansion of the liquid 41. The liquid utilized, in the present instance, is glycerin, but I do not intend to limit my invention to any specific liquid since a wide variety of liquids may be satisfactorily utilized for the purpose of my invention.

Disposed within the chamber 40 is a glass thermometer tube 45 of conventional design, having a central bore 46 which terminates at the lower end of the thermometer tube in a bulb 47 in which is conventionally stored a supply of mercury 48 or similar medium adapted to respond to temperature changes in the liquid in which the thermometer tube 45 is positioned. Spaced indicia 50 are engraved or otherwise formed in the periphery of the tube 45 and serve to indicate the temperature of the fluid zone in which the thermometer has been immersed. The thermometer tube 45 is mounted within the chamber 40, as best seen from Fig. 4 of the drawing, with its vertical axis positioned to one side of, i. e. eccentrically to, the vertical axis of the chamber 40 and the housing 26.

By thus positioning the thermometer tube 45 eccentrically with respect to the vertical axis of the housing 26, the greater amount of the liquid 41 is interposed between that portion of the thermometer which bears the indicia 50 and the wall 28. In this manner, the magnifying effect secured by the convexity of the wall 28 is substantially enhanced by the magnifying effect of the body of the liquid 41 disposed before the indicia 50 within the chamber 40. Although the greater proportion of the liquid 41 is disposed before the portion of the thermometer tube 45 bearing the indicia 50, it should be observed that, at no time, is the thermometer tube 45 in contact with the adjacent wall 28 since the liquid 41, in addition to performing a magnifying function, serves also to thermally insulate the thermometer tube from the wall 28.

Provided in the reduced portions 31 of the plugs 30 are seats 52 which are adapted to receive the oppositely disposed ends of the thermometer tube 45 and to locate the thermometer tube 45 in a predetermined orientation with respect to the vertical axis of the housing 26 thereof. Disposed within the seats 52 in contact with the opposite ends of the thermometer tube 45 are shock-absorption means 54 constituted by coil springs 55. When the housing 26 of the thermometer 25 strikes upon an object, the vertical components of force are absorbed in the shock-absorption means 54, and loads which might otherwise fracture the thermometer tube 45 are rendered harmless. By providing the shock-absorption means 54 and the body of liquid 41 surrounding the thermometer tube 45, the possibility of damage to the thermometer tube 45 by shock load is practically eliminated, and the life of the thermometer tube is greatly prolonged.

Since it is desirable that, when the thermometer string is inserted in the top 18 of the guide pipe 19, the entire string be carried downwardly through the pipe 19 to the bottom 20 thereof, the lowermost thermometer 45 is weighted so that its weight will draw the thermometer string downwardly in the guide pipe 19. For this purpose, the lower plug 30 is provided with an elongated cylindrical opening 57 which is adapted to receive a cylindrical, lead plug 58 and the base of the opening is closed by a plug 59 which is connected thereto.

When the thermometer housing 26 is completely assembled, the assembly is dipped in a transparent plastic substance which provides a smooth coating 60 of plastic which fills the various joints in the housing 26 and prevents the leakage of fluid thereinto and the leakage of liquid therefrom. In addition to preventing fluid leakage, the plastic coating 60 serves to present a smooth exterior to the body of the fluid 21 in which it is immersed. Therefore, when the thermometer 45 is withdrawn from the top 18 of the guide pipe 19, the fluid accumulated upon the surface thereof can be readily wiped off the plastic coating 60 so that the thermometer indicia 50 may be immediately read before any possibility that a temperature change can induce a change in the thermometer reading.

Since the upper end 18 of the guide pipe 19 projects through the movable roof 12 of the tank 10, it is necessary that the roof 12 be sealed in respect to the periphery of the guide pipe 19 and sealing means adapted to seal the opening 61 in the roof 12, as best shown in Fig. 5, is provided to prevent the leakage of volatile fumes through the opening 61 in the roof 12. The portion of the roof 12 surrounding the opening is provided with an annular downstruck flange 62, adjacent which is mounted a circular, flexible gland 64, which may be formed of rubber or similar material, adapted to wipe upon the periphery of the guide pipe 19. The outer edge of the gland ring 64 is secured against the top of the roof 12 by means of a ring 65, formed of metal, and having an upstruck annular flange 66. The ring 65 is secured to the top of the roof 12 by means of bolts 67 and nuts 68, or any other desirable fastener. As the roof 12 rises and falls with the change in the amount of fluid stored within the tank 10, the inner edge of the gland ring 64 is carried along the periphery of the tube 19 in sealing relationship therewith. Thus, the leakage of fumes or fluids through the opening 61 in the roof 12 is prevented.

The graph shown in Fig. 6 indicates, on line "C," the temperature drop which is encountered in the use of conventional tank thermometers, while line "D" indicates the thermometric inertia of a thermometer constructed in accordance with my invention. While a time lag of one minute is shown by the graph, in most applications the time lag is for a substantially longer period and can, of course, be controlled by changing the dimensions of the housing and the spacing of the thermometer tube with respect to the wall thereof.

Thus, I provide by my invention a tank thermometer having an intermediate tubular portion which is defined by a transparent wall enclosing a chamber adapted to contain a body of liquid. Immersed in the body of liquid is a thermometer tube which is positioned eccentrically with respect to the vertical axis of said chamber. The indicia drawn upon the thermometer tube are magnified by the body of liquid contained in the chamber and the thermometer tube is insulated from the surrounding atmosphere and surrounding fluid by the body of liquid. In addition, the body of liquid serves to retain the indicia upon the thermometer tube in a state of initial clarity and absorbs a proportion of the shock loads imposed upon the housing of the thermometer. The thermometer is provided with shock-absorption means adapted to prevent the fracture of the thermometer by vertical loads imposed upon the housing thereof. Bumper means are provided at opposite ends of the housing adapted to prevent abrasive contact of the transparent wall of the housing with surrounding areas and the entire housing is enclosed in a plastic sheath adapted to permit the ready removal of liquid accumulated thereupon to permit the immediate reading of the thermometer. Also, a guide pipe is employed which extends downwardly into the interior of a storage tank and is provided with oppositely disposed openings adapted to permit fluid contained in the tank to flow therethrough into contact with the periphery of the thermometer to communicate the temperature of the fluid to said thermometer.

In operation, when one of the thermometers 25 is immersed in the fluid 21 within the storage tank 10, the fluid flows through the openings 22 of the guide pipe 19 into contact with the walls 28 of the thermometers 25. At first, the contact of the fluid 21 with the thermometers 25 serves only to affect the liquid 41 within the chambers 40, but eventually the heat of the fluid within the storage tank 10 is communicated through the liquid 41 to the thermometer tubes 45. When the thermometers 25 are drawn upwardly through the adjacent levels of fluid, which may be at different temperatures, the thermometric inertia afforded to the tubes 45 by the insulation effect of the liquid 41 prevents the temperatures recorded upon the thermometer tubes 45 of the thermometers 25 from being altered as they pass upwardly through liquid zones having different temperatures and through the vapors 23 at the top of the interior of the tank 10.

In addition, when each thermometer 25 is withdrawn from the top 18 of the guide pipe 19 and exposed to atmospheric temperatures and to the evaporation of the fluid upon the surface of the housing 26, the insulating characteristics of the liquid 41 in the chamber 40 will prevent such factors from having an immediate effect upon the temperature recorded by the thermometer tube 45.

Thus, the liquid 41 contained within the chamber 40 of the housing 26 of each thermometer 25 serves to partially absorb any shock loads borne upon the housing 26 of the thermometer 25 and to isolate the thermometer tube 45 therefrom, to magnify the indicia 50 upon the surface of the thermometer tube 45 and to impart a thermometric inertia or stability to the thermometer tube 45, which permits the thermometer tube 45 to maintain a temperature reading recorded thereupon although exposed to variant conditions which would tend to change said reading. The fact that the body of the thermometer tube 45 is continually suspended in the liquid 41 serves to maintain the indicia 50 upon the thermometer tube 45 in a condition of initial clarity so that no difficulty is ever encountered in reading said indicia.

Although I have shown and described a preferred embodiment of my invention for the purpose of illustrating its form of construction and manner of operation, it is obvious that changes, substitutions and modifications may be made in the specific elements of the invention shown and I, therefore, do not intend to be limited to said specific elements but desire, rather, to be afforded the full scope of the patent claims.

I claim as my invention:

1. In a thermometer adapted to be wholly immersed in a body of fluid, the combination of: a housing, said housing including an intermediate tubular portion having a transparent wall and defining a chamber in which is permanently contained a body of liquid; and a bulb thermometer tube having indicia formed thereupon entirely disposed within said chamber and having at least its bulb portion and the greater portion of its length bearing said indicia completely surrounded by said body of liquid.

2. A combination as defined in claim 1, in which said tube has its longitudinal axis eccentrically positioned with respect to the longitudinal axis of said chamber.

3. A combination as defined in claim 1, in which said chamber has positioned in opposite ends thereof shock-absorption means and said shock-absorption means and said tube are eccentrically positioned with respect to the longitudinal axis of said chamber.

4. In a thermometer adapted to be wholly immersed in a body of fluid, the combination of: an elongated housing including an intermediate tubular portion having a transparent wall and defining a cylindrical chamber; a body of liquid permanently contained in said chamber; and a separate thermometer tube entirely disposed in said chamber having indicia formed thereupon and having the lower portion of its length and the major portion of said indicia immersed in and surrounded by said liquid.

5. A combination as defined in claim 4, in which said housing includes bumper means, said bumper means providing seats for the opposite ends of said tube, said seats and said tube being eccentrically disposed in relation to the vertical axis of said housing.

6. A combination as defined in claim 4, in which said housing includes bumper means and one of said bumper means is provided with weight means adapted to cause said thermometer to be carried downwardly through said body of fluid.

7. In an apparatus adapted to ascertain the temperature of the contents of a deep tank, the combination of: a plurality of elongated thermometers attached to one another and spaced a predetermined distance apart, each of said thermometers including a housing having an intermediate tubular portion provided with a transparent wall, the tubular portion defining a chamber in which is permanently located a body of insulating liquid and a bulb thermometer provided with indicia entirely disposed within said chamber and having at least its bulb portion and the greater length of the portion bearing said indicia completely surrounded by said body of liquid; and a guide pipe vertically positioned within said tank and protruding from the top thereof, said guide pipe having a plurality of vertically spaced openings formed therein, adjacent which said thermometers are adapted to be positioned, the said openings permitting the contents of said tank to circulate past said thermometers.

8. An apparatus as defined in claim 7, in which the external diameter of a portion of said thermometers is substantially less than the internal diameter of said guide pipe to permit said contents to circulate through said openings in said guide pipe about said portion.

9. A housing for a tubular thermometer having indicia formed upon the surface thereof including: an intermediate portion having a transparent wall defining a chamber for receiving said thermometer, said housing providing upper and lower seats for receiving the opposite ends of said thermometer, and the longitudinal axes of said seats being eccentrically disposed with respect to the longitudinal axis of said housing; and a body of liquid contained in said chamber, the greater portion of said liquid lying in front of said indicia when said thermometer is disposed in said seats.

FRANK E. BROWN.

References Cited in the file of this patent

UNITED STATES PATENTS

| Number | Name | Date |
|---|---|---|
| 577,016 | Fairchild | Feb. 16, 1897 |
| 1,561,659 | Nichols | Nov. 17, 1925 |
| 1,868,911 | Phelps | July 26, 1932 |
| 2,104,218 | Betzold et al. | Jan. 4, 1938 |
| 2,316,677 | Edwards et al. | Apr. 13, 1943 |

FOREIGN PATENTS

| Number | Country | Date |
|---|---|---|
| 24,435 | Germany | Apr. 11, 1883 |
| 7,150 (1893) | Great Britain | Feb. 10, 1894 |
| 25,361 (1894) | Great Britain | Nov. 2, 1895 |
| 26,321 | Sweden | May 15, 1907 |

OTHER REFERENCES

Ingersoll (Article) Physics, vol. 2; March 1932 (pages 155 and 156 relied on).